(Model.)

3 Sheets—Sheet 1.

E. THACHER.
SLIDE RULE.

BEST AVAILABLE COPY

No. 249,117.

Patented Nov. 1, 1881.

WITNESSES.
Warren L. Clark
Claudius L. Parker

INVENTOR.
Edwin Thacher
by George H. Christy
ATTORNEY.

N. PETERS, Photo-Lithographer, Washington, D.C.

(Model.)
E. THACHER.
SLIDE RULE.
No. 249,117. Patented Nov. 1, 1881.
3 Sheets—Sheet 2.
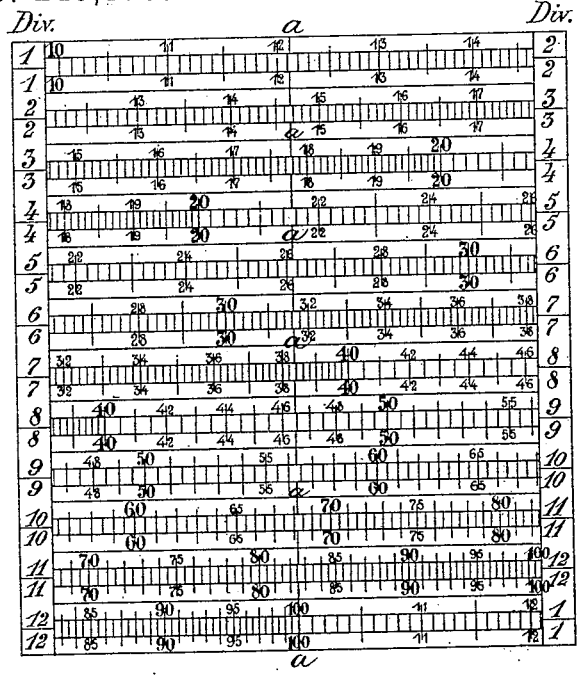
Fig 6.
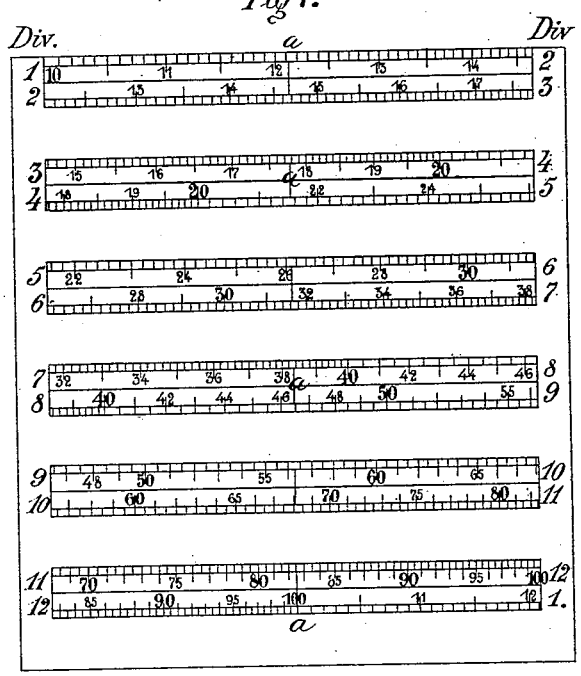
Fig 7.
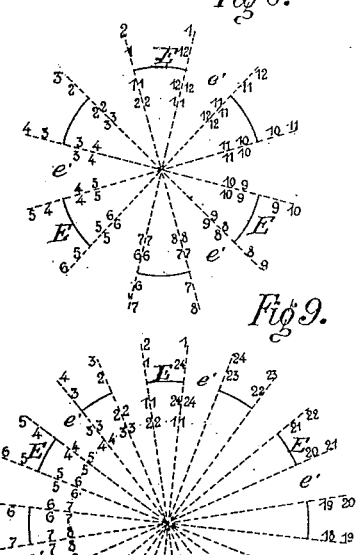
Fig 8.
Fig 9.
Fig 10.
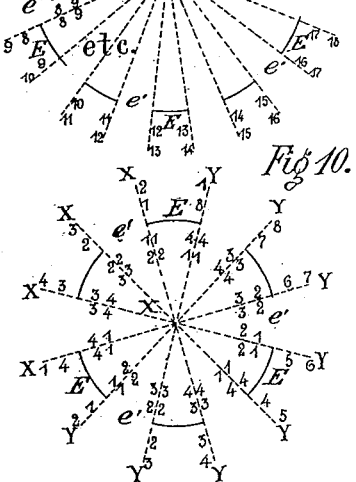
WITNESSES.
INVENTOR.
Edwin Thacher,
by George H. Christy
ATTORNEY.

(Model.)

BEST AVAILABLE COP'

E. THACHER.

SLIDE RULE.

No. 249,117.

3 Sheets—Sheet 3.

Patented Nov. 1, 1881.

WITNESSES.

INVENTOR.
Edwin Thacher
by George H. Christy
ATTORNEY.

UNITED STATES PATENT OFFICE.

EDWIN THACHER, OF PITTSBURG, PENNSYLVANIA.

SLIDE-RULE.

SPECIFICATION forming part of Letters Patent No. 249,117, dated November 1, 1881.

Application filed February 3, 1881. (Model.)

*To all whom it may concern:*

Be it known that I, EDWIN THACHER, of Pittsburg, county of Allegheny, State of Pennsylvania, have invented or discovered a new and useful Improvement in Slide-Rules; and I do hereby declare the following to be a full, clear, concise, and exact description thereof, reference being had to the accompanying drawings, making a part of this specification, in which—like letters indicating like parts—

Figure 1:
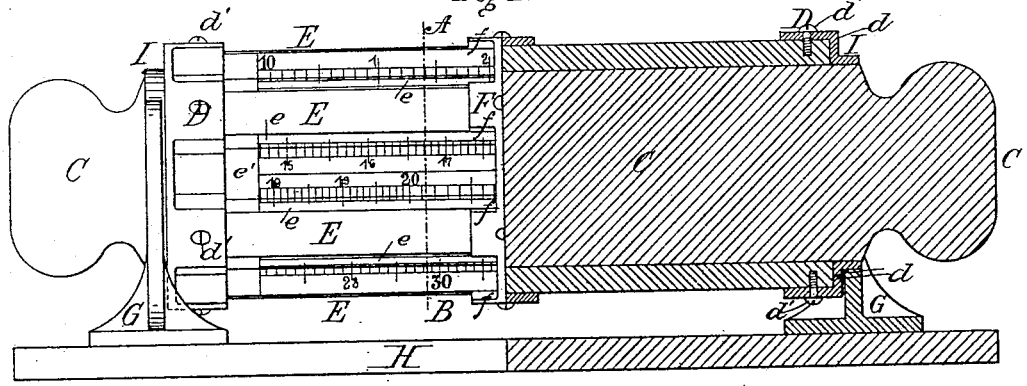
Figure 3:
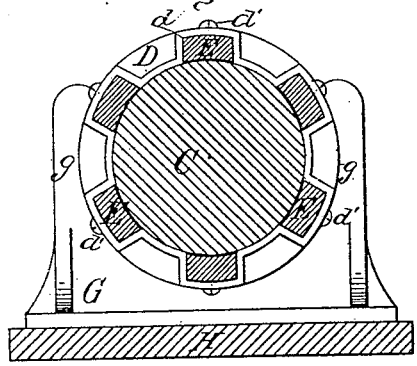
Figure 2:
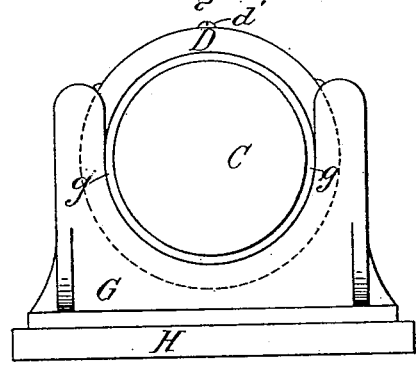
Figure 4:
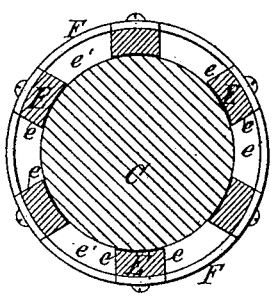
Figure 5:
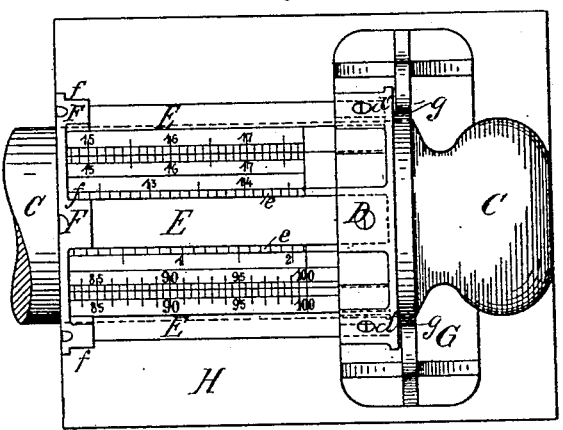

Figure 1, Sheet 1, represents a cylindrical slide rule illustrative of my invention, one-half being shown in side elevation and one-half in longitudinal section. Fig. 2 is an end view of the same. Fig. 3 represents a section through A B, Fig. 1, looking toward the end. Fig. 4 represents a section through A B looking toward the center. Fig. 5 represents a top view of one-half of the rule. Fig. 6, Sheet 2, represents a development of an arrangement of logarithmic scales as applied to the surface of the slide for first-power computations. Fig. 7 represents a similar development or a corresponding set of scales as formed on the envelope. Figs. 8, 9, and 10 are diagram views further illustrative of the manner of arranging the scales on the rule; and Figs. 11 and 12, Sheet 3, represent, by an enlarged view, a development of scales for computing in second powers.

My invention relates to certain improvements in logarithmic slide-rules, and, in general terms, consists in making the rule of cylindrical form, having a rotary and longitudinally moving slide inclosed by a series of bars or an envelope, and on such slide and bars are arranged logarithmic scales of greater length than the length of the graduated space of the rule, parts of such scales being laid off on separate parallel lines, as hereinafter described.

In the drawings, Sheet 1, C represents a cylindrical slide, on the surface of which are graduated logarithmic scales, as presently described. At regular intervals around and inclosing this slide are arranged longitudinal bars E, on the edges $e$ of which are also graduated scales, as presently described. These bars E may be made separate and their ends secured in sockets $d$ formed in rings or bands D, or they may be formed by cutting slotted openings $e'$ lengthwise in a cylinder of metal or other suitable material. The length, size, and thickness of slide C and bars E may be varied as desired; but I prefer that the bars be made thick enough to lay off scales on their slightly-beveled edges $e$, so that the divisions of such scales may come in contact with the surface of the slide C. This is for convenience and accuracy of comparison, and is not an essential element, as the bars may be made thinner and the scales be laid off on their upper faces. When the bars are light or are of considerable length they may be supported at the center by an encircling band, F, which, being made narrow or cut away somewhat at the points $f$ between bars, will not materially hide the scales made on the edges $e$ and on the slide.

The bands D and bars E constitute an envelope within which the slide C can be moved longitudinally back and forth or be rotated at pleasure. The under faces of the bars are made to conform to the curve of the slide, or are made concave, so that their under edges may come close to the slide. The slide should be made to move within the envelope with a little friction, and thereby preserve any relative position or setting which may be desired. To this end strips of flannel or other soft or elastic material may be placed between the bars and slide, and as such material becomes worn the bars may be set down upon the slide by means of screws $d'$. Such strips will also tend to keep the surface of the slide clean and prevent rubbing.

For convenience in supporting and operating the rule, especially when made of considerable size or heft, I provide standards or supports G, which are secured to a base, H, and receive the journals I of bands D in open bearings $g$ formed in the tops of the standards. If preferred, however, the bearings may encircle the journals by caps or equivalent means. In either case the envelope may be held and the slide be revolved or moved endwise, or the slide may be held and the envelope revolved, or both slide and envelope may be moved simultaneously.

The width of bars E and of spaces $e'$ between the bars is, by preference, made equal, or about equal, to the distance between graduated lines on the slide so as to permit convenient reading of the scales on the surface of the slide, and with such precaution the number of bars E may be multiplied as desired. I prefer the relative widths of bars and spaces shown in Figs. 3 and 4, and when a greater number of bars are desired than there shown I prefer to increase the diameters of slide and envelope.

The graduated lines on the slide C are parallel with bars E, and of equal number with the side edges of such bars, and they are arranged at equal intervals around the surface of the slide, so that all lines on the slide may be exposed between bars at the same time. These lines, as well as those on the edges e of the bars, are graduated as parts of logarithmic scales—that is, scales in which the distance of any number from the beginning of the scale represents the decimal part of the logarithm of that number. Such scales are usually laid off from 1 to 10 or from 10 to 100, the latter numbering being adopted in the present instance. These numbers, or the values of the divisions represented thereby, are purely arbitrary. Thus 10 on the scale may mean 1, 10, or 100, or .1, .01, &c., as the nature of the problem to be solved may require. Such scales represent the logarithms of all numbers, the accuracy of the reading depending upon the length of scale employed and the number of its subdivisions. The manner of using such scales for making computations is well understood and need not here be described in detail.

The purposes of my invention are to increase the length and accuracy of such scales without increasing the length of the rule, and to render the use of such rule more convenient. An important means to this end is the arangement or disposition of such scales upon different parts of the rule, which I will now describe.

In Figs. 6 and 7, Sheet 2, I have shown a development of logarithmic scales as employed for first-power computations, all the scales being of the same length, and each being longer than the length of graduated space. Fig. 6 shows twelve successive lines of graduations as laid off lengthwise upon and at regular intervals around the surface of slide C, and Fig. 7 shows the same number of lines as laid off on the side edges of the six bars E. Two complete scales, numbered from 10 to 100, are shown in each of these figures, four in all, each exceeding the length of the graduated space, parts of such scales being laid off on separate equidistant and parallel lines in the direction of the rule's length. These scales may be read on the lines in two different ways—that is, on alternate lines from left to right entirely across the graduated space on the rule—and in this case one scale in each of the figures begins at the left of the upper line and, continuing on lines 3 5 7 9, ends on the right of line 11, such numbers being as marked in the left-hand margin and counted from the top of each figure downward. The other scale begins with line 2 at a division of the scale corresponding with the middle division of the upper line and, continuing on lines 4 6 8 10, ends in the middle of line 12, the balance of this line toward the right containing that part of the scale preceding the beginning of line 2; or, on the other hand, the lines may be read in the same direction from left to right, but half-way across only, and on successive half-lines from the top downward. In the latter case the graduated part of the rule is assumed to be divided into right and left hand columns by an imaginary center line, (represented by a,) and the half-lines thus made are, for convenience of reference, numbered from 1 to 12 in the margins in the order which such part lines occupy in their respective scales. In practice, however, it will be found convenient to substitute for these marginal numbers the numbers corresponding to the end or end and middle graduations on each line. I have chosen the numeration shown simply for brevity and simplicity in description. On the left hand side of such imaginary division a the scale runs from the top to the bottom half-lines in regular order and succession. On the right-hand side the scale runs in the same order and succession, but begins at the top with the second half-line, the first half-line of this scale being found at the bottom. When wrapped around or formed on the surface of the slide C or on the envelope E, this feature of beginning the scales at different points relatively results in causing the divisions or half-lines of the scale to follow each other in regular and the same order, whether read in either of the ways above described, and also carries the half-lines of the scale in one column one step in advance of the corresponding half-line in the other column. This I consider an important feature in the arrangement of the scales, as by it complete scales are found in contact on slide and envelope for each setting of the slide, and results are obtained thereby which could not be obtained with equal facility if the scales in both columns began on the same line. As a matter of convenience the graduated lines on the slide, Fig. 6, are numbered on both sides, so that the numbers may be visible whichever side of the lines may be exposed between the bars E.

It will be observed that whichever way the scales are read a complete logarithmic scale is found on either the right or left hand side of center line, a, on both slide and envelope or bars. Also that by rotating either the slide or envelope, or both, any half-line on the slide may be brought in contact with any desired half-line on the bars, and that by the longitudinal motion of the slide any two graduations or subdivisions in those half-lines may be brought in contact or made to register without moving the end of the slide beyond the center line, a, of the envelope; and, further, that when so set complete logarithmic scales will be found in contact for direct comparison, one on the lines of the slide and one on the edges of the bars. This is true for every possible setting of the rule, it being understood, of course, that when the desired setting may be made in more than one place, that one be chosen which involves the least endwise movement of the slide. Consequently, the scales on slide and envelope being set for any given ratio, such ratio may be multiplied by every possible number within the reading limits of such scales, and the results be read without a resetting of the rule.

This rule, having four scales of the same length, two on the slide and two on the envelope, arranged as shown and described, is adapted to the working of all commercial problems which can be stated under the form $a=\frac{bc}{d}$, including problems in multiplication, division, proportion, fractions, interest, fellowship, valuation, including pay-rolls, areas, weights, measures, &c., by the following general rule.

Rule I: Set one of the numerators on the slide to the denominator on a bar of the envelope; then opposite the other numerator on the envelope read the answer on the slide.

The proper statement of such problems, and the manner of solving them by means of logarithmic scales, is well understood in the art, and need not be described in detail.

The following examples are given by way of illustration:

The product of one number multiplied by another may, in accordance with the above rule, be stated as $a=\frac{b \times c}{1}$. Let $b=5$ and $c=13$. Then set 5 on the slide C to 1 on bars E; opposite 13 on the bars read the product $a$ on the slide.

The quotient of one number divided by another may be stated as $a=\frac{b \times 1}{d}$. Let $b=63$ and $d=7$. Set 1 on slide C to 7 on bars E; opposite 63 on the bars read quotient $a$ on the slide.

In proportion the terms are commonly stated, as above, $a=\frac{b \times c}{d}$. Let $b=6$, $C=14$, and $d=3$. Set 6 on slide C to 3 on bars E; opposite 14 on bars E read $a$ on the slide.

The same features of arrangement and the same advantages are embodied in and secured by the above-described rule, having logarithmic scales differing in length adapted to computing problems involving powers and roots. I have illustrated one such case by the development, Sheet 3, Figs. 11 and 12, and the diagram view, Fig. 10, Sheet 2.

Figure 11:
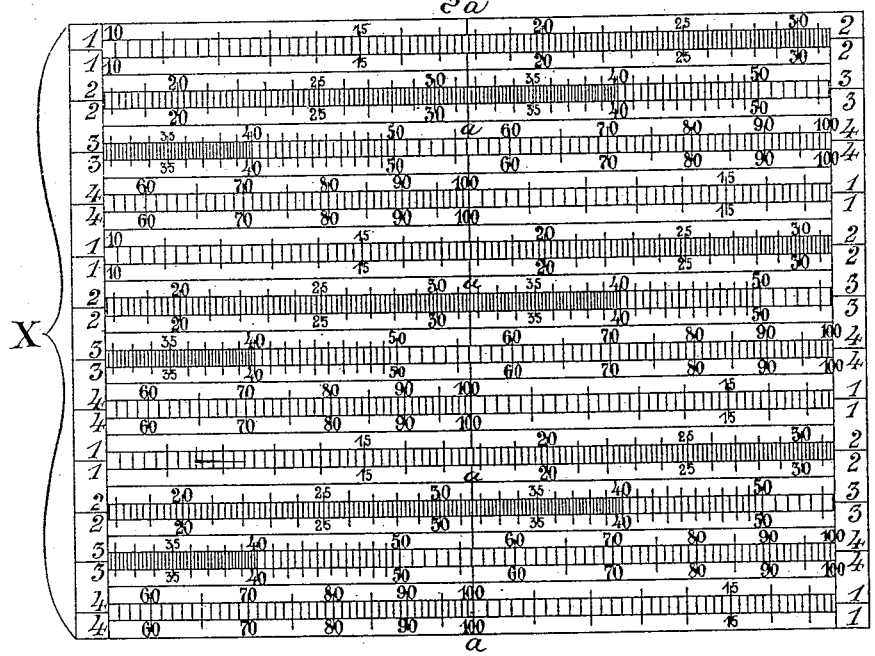

In Fig. 11 are shown scales as arranged on the slide, such arrangement being the same in all respects as that before described, except that the scales are only one-third the length before shown, or are arranged on one-third the number of lines, and in order to fill all the lines on the slide such scales are given in full three times when read in either of the ways described in Figs. 6 and 7.

Figure 12:
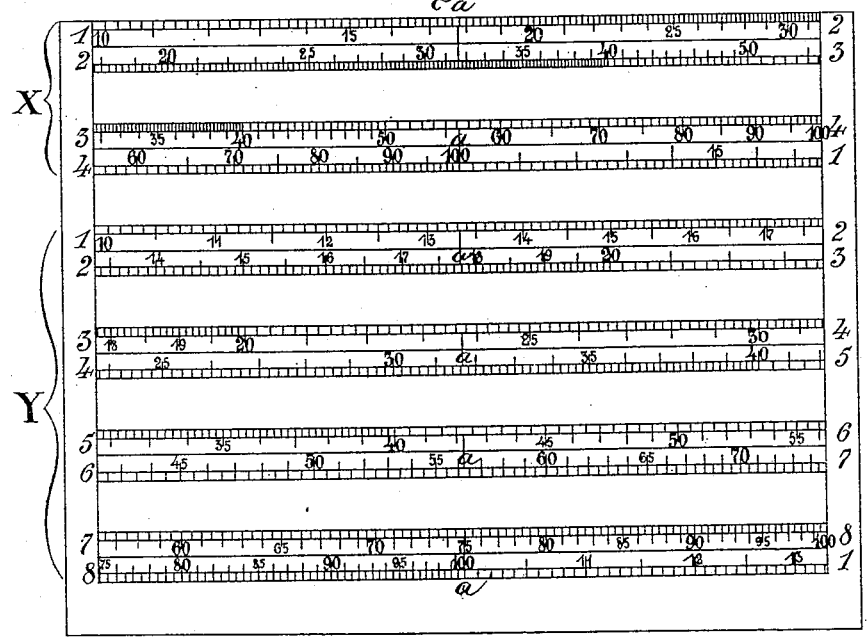

In Fig. 12 are shown scales of two different lengths. Two scales (marked X) are of the same length and arrangement as those in Fig. 11, except that they are laid off on the edges of two of the bars E instead of on the slide. On the edges of the other four bars E are arranged two scales, Y, each of which is twice the length of scales X, and occupy four full bars instead of two. In manner of arrangement and reading scales X and Y are the same, their only difference being in length.

The scales, Fig. 11, being arranged as shown and described on the slide C, and those of Fig. 12 on the bars of the envelope, it is obvious that by rotating either the slide or envelope, or both, any two half-lines on slide and envelope may be brought in contact, and that by longitudinal movement of the slide any two graduations or subdivisions in such part lines may be brought in line or contact, and when thus set any desired multiplications or divisions may be made which can be stated under the form $a=\frac{bc^2}{d}$, by the following rule:

Rule II: Set $b$ on the slide to $d$ on line X of the envelope; then opposite $c$ on lines Y of the envelope read the answer on the slide. For example, let $b=6$, $c=14$, and $d=3$. Then set 6 on slide C to 3 on lower lines of bars E; opposite 14 on upper lines of E read $a=392$.

For problems involving third powers the scales Y should be three times the length of scales X.

In respect to the features of arrangement above described, the second and third power scales embody in part the same invention as the scales for first-power computations above described. By adding other features of invention scales for powers may be arranged along with the scales of Fig. 7 on the bars E, and both be used in common with the scales of Fig. 6 on the slide, and problems involving various powers be solved by the one instrument. Such additional features of invention will, however, form the subject-matter of a separate application for patent.

In Figs. 8 and 10, Sheet 2, I have further illustrated by diagrams the manner of arranging the scales upon the rule. In these figures the heavy arc lines E represent the bars of the envelope, and the blank spaces $e'$ represent the exposed surface of slide C between bars. The numbers on the dotted radial lines represent the half-lines of the scales, such numbers corresponding to the numbers at the margins of the development views, and of such numbers those adjacent to the arc lines E on the outside and inside represent the divisions of the half-lines as they recur on the envelope and slide respectively on the left half of the rule, and the numbers more distant represent the corresponding order of half-lines on the right side of the rule. In addition to this the letters X and Y, Fig. 10, represent the relative positions on the bars E of the scales so lettered in Fig. 12. This illustration is given on account of the difficulty of showing such graduated scales on a cylindrical surface, and, taken in connection with the other figures and the description herein given, will indicate with sufficient clearness the application of scales, Sheets 2 and 3, to a rule substantially such as that shown in Sheet 1.

In Fig. 9 I have illustrated a rule of the same character as that of Fig. 8, except that it is of greater diameter, and has twelve bars instead of six, and twenty-four graduated lines on both slide and bars instead of twelve, as before. The scales are carried over these lines and arranged on the right and left of the transverse center in the same order as above described, except that they are carried over a greater number of lines, and are thus made longer and capable of more minute subdivision. Such a rule having the same length as that of Fig. 8 will have double the length of scales, and will thus enable closer reading and more accurate results. By thus increasing the diameter of the rule and the number of bars and graduated lines, scales may be made capable of any desired accuracy without material increase in the size of the rule and without any increase in its length. This in practice is a consideration of great importance, as the value of such rules for computing purposes depends in large measure upon the accuracy or reliability of the results obtained, and also the rapidity and ease, both mechanical and mental, with which such results can be found. These conditions are effectually and practically secured by my invention.

As represented in Fig. 9 the scales are twenty-four times as long as in the ordinary rule of equal length, and this difference may be increased to any extent by increasing the diameter and number of lines, as above described.

By arranging two or more scales on separate lines on both slide and bars, and continuing or extending parts of such scales over successive lines in regular order, as described, and providing for both rotary and longitudinal motion of the slide, I secure very important advantages in working the rule over rules commonly in use.

My improved rule can be set to any required numbers with a minimum movement or extension of the parts. Being set to a common ratio, any desired number of multiplications can be made of such ratio and the results read without resetting, and such results are all found on a surface of comparatively small length and within easy reading distance. Also, the rule may be adapted for either ordinary commercial calculations or for the more intricate problems met in the work of civil engineers or for both such classes of work, and any desired degree of accuracy may be secured therein without making the rule of inconvenient proportions.

I claim herein as my invention—

1. A slide-rule having on both the slide and on the body or bars of the rule two or more logarithmic scales, each exceeding in length the length of graduated space on the rule, parts of such scales being laid off on successive parallel lines, and means for bringing the several parts of scales on slide and bars in position for direct comparison, substantially as set forth.

2. A slide-rule having, in combination, a slide, C, of cylindrical form, with graduated scales formed on its surface in the direction of its length, and parallel bars E, in any desired number, connected together and arranged at intervals around the surface of the slide, with graduated scales formed on such bars, the slide and bars being capable of rotary and longitudinal motion with relation to each other, substantially as set forth.

3. In a slide-rule, a cylindrical slide, C, having graduated scales formed on its surface in successive equidistant and parallel lines of any desired number, in combination with an inclosing-envelope formed of connected bars E, in any desired number, the width of bars and spaces between bars being equal, or about equal, to the distance between the graduated lines on the slide, such bars having graduated scales formed lengthwise thereon, and the slide and bars being capable of both rotary and longitudinal motion with relation to each other, substantially as described, whereby any desired graduations in the scales on slide and bars may be brought in contact or made to register, and when so adjusted the other graduated lines on the slide will be exposed between the bars of the envelope in position for direct comparison with the graduated lines on the adjacent bars.

4. A slide-rule having a cylindrical slide, C, with two or more logarithmic scales formed on its convex surface, parts of such scales being laid off on two or more equidistant parallel lines in the direction of the length of the slide, in combination with connected inclosing-bars E, equal in number to half the number of lines on the slide, such bars having at their side edges two or more logarithmic scales, parts of such scales being laid off on separate edges of the bars, substantially as and for the purposes set forth.

5. In a slide-rule, a cylindrical slide, C, having one or more complete logarithmic scales on both the right and left of the transverse center of its graduated face, equal parts of such scales being laid off on successive parallel lines around the surface of the slide in the direction of its length, such parts following each other both around and lengthwise of the slide in the regular order of scales, in combination with an inclosing envelope having on its bars E logarithmic scales arranged in the same order and succession as on the slide, such slide and envelope being capable of both rotary and endwise motion with relation to each other, substantially as set forth.

6. A slide-rule having, in combination, a cylindrical slide, C, an envelope composed of connected bars E, in any desired number, arranged parallel with the slide at equal intervals around its convex surface, such slide and envelope being capable of both rotary and longitudinal motion with relation to each other, with two or more logarithmic scales on the surface of the slide parts of such scales, being laid off on separate parallel and equidistant lines in the direction of the slide's length, such part scales forming one or more complete scales on both the right and left sides of the transverse center of the graduated surface, and two or more logarithmic scales of the same or different lengths on the bars of the envelope, parts of such scales being laid off on different edges of the bars in the same order and succession as on the slide, substantially as and for the purposes set forth.

In testimony whereof I have hereunto set my hand.

EDWIN THACHER.

Witnesses:
 R. H. WHITTLESEY,
 C. L. PARKER.